United States Patent [19]
Meyers et al.

[11] Patent Number: 5,557,315
[45] Date of Patent: Sep. 17, 1996

[54] DIGITAL PRINTER USING A MODULATED WHITE LIGHT EXPOSURE SOURCE

[75] Inventors: Mark M. Meyers, Hamlin; Raymond E. Wess, Holley, both of N.Y.

[73] Assignee: Eastman Kodak Company, Rochester, N.Y.

[21] Appl. No.: 292,451

[22] Filed: Aug. 18, 1994

[51] Int. Cl.$^6$ .............................. B41J 2/47; G01D 15/14; G03B 27/72; G02F 1/11
[52] U.S. Cl. .................. 347/244; 347/239; 347/255; 347/232
[58] Field of Search ................................ 347/244, 239, 347/255, 232

[56] References Cited

U.S. PATENT DOCUMENTS

| | | | |
|---|---|---|---|
| 3,843,960 | 10/1974 | Kanazawa | 348/758 |
| 4,006,970 | 2/1977 | Slater et al. | 359/259 |
| 4,125,322 | 11/1978 | Kaukeinen et al. | 347/118 |
| 4,389,096 | 6/1983 | Hori et al. | 359/95 |
| 4,531,195 | 7/1985 | Lee | 359/559 |
| 4,786,146 | 11/1988 | Ledebuhr | 359/63 |
| 5,019,898 | 5/1991 | Chao et al. | 348/766 |
| 5,068,530 | 11/1991 | Ieki et al. | 250/237 G |
| 5,121,137 | 6/1992 | Taki et al. | 347/232 |
| 5,126,836 | 6/1992 | Um | 359/618 |
| 5,185,660 | 2/1993 | Um | 348/771 |
| 5,237,435 | 8/1993 | Kurematsu et al. | 359/95 |
| 5,296,958 | 3/1994 | Roddy et al. | 347/244 |

Primary Examiner—Benjamin R. Fuller
Assistant Examiner—Raquel Yvette Gordon
Attorney, Agent, or Firm—Frank Pincelli

[57] ABSTRACT

A method and apparatus for writing onto a photosensitive material with a single white light source. The apparatus includes a light source for producing a light composed of at least two color components, a collimating lens for collimating the light emanating from the light source so as to form a beam of light, and a beam splitter for splitting the beam of light into a plurality of individual predetermined beams of light, each having a different color. A modulator is also provided for modulating the intensity of each of the color beams of light individually in accordance with image data for each of the colors. The individual light beams are then recombined into a single beam of light and directed onto a photosensitive material.

21 Claims, 2 Drawing Sheets

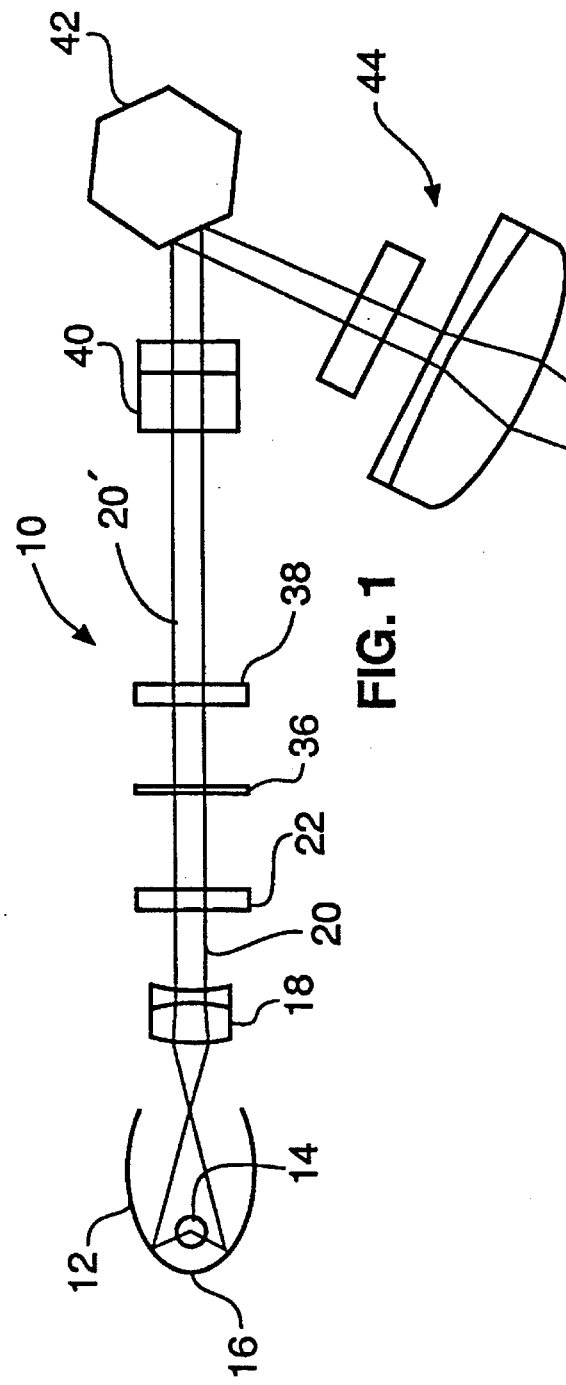
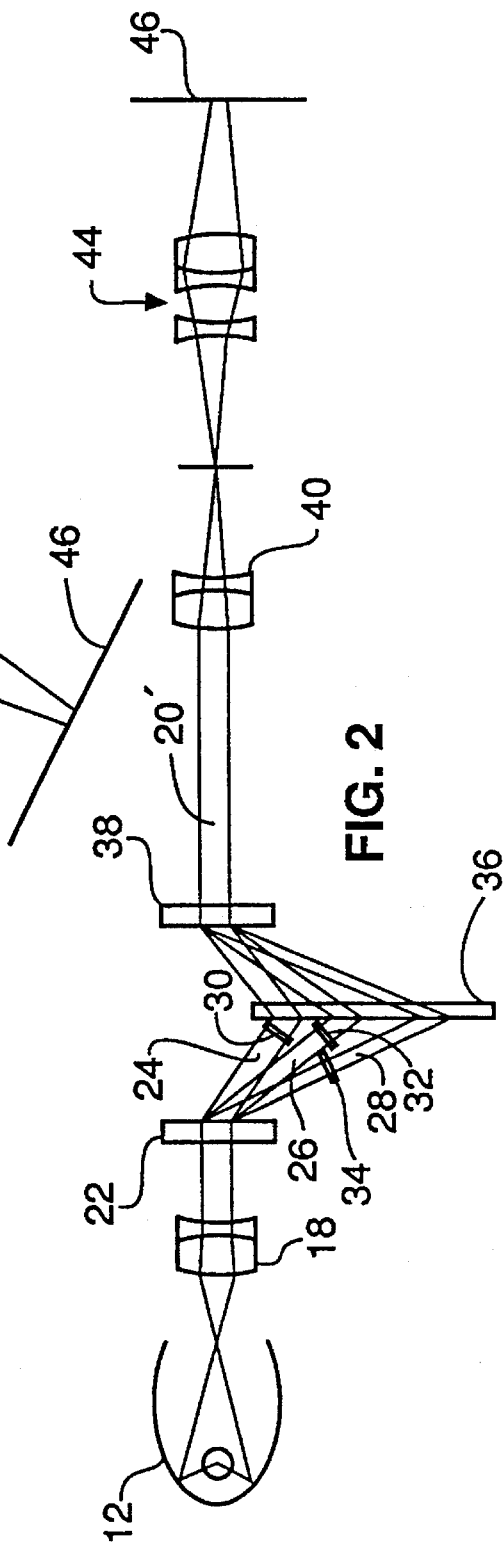

DIGITAL PRINTER USING A MODULATED WHITE LIGHT EXPOSURE SOURCE

FIELD OF THE INVENTION

The present invention relates to a method and apparatus for modulating a beam of white light so as to allow simultaneous writing a red, green, and blue image onto a photosensitive media.

BACKGROUND OF THE INVENTION

In many instances it is desirable to expose photosensitive media (such as photographic emulsions), which are sensitive to red, green, and blue light simultaneously. Numerous techniques to form continuous tone digital images exist which include three-color laser printing, rotating light-emitting diodes (LEDs), and cathode ray tube (CRT) exposure systems. The optical mechanical portion for the three-color laser writer are relatively inexpensive, however, the cost of the blue and green laser sources are relatively expensive, making the prior art systems cost prohibitive. LED and CRT printers are relatively slow and are also relatively expensive to manufacture and operate.

The present invention provides a printer which is relatively inexpensive to make and use which is reliable for writing of white light onto a photosensitive material, which allows high speed writing of color images and the use of existing photosensitive material.

SUMMARY OF THE INVENTION

In one aspect of the present invention there is provided a printer for writing onto a photosensitive material with a single white light source which comprises:

- a light source for producing a light composed of at least two color components;
- a collimating lens for collimating the light emanating from the light source so as to form a beam of light;
- a beam splitter for splitting the beam of light into a plurality of individual predetermined beams of light, each of said beams of light having a different color;
- a modulator for modulating the intensity of each of the colored beams of light individually in accordance with image data for each of the colors;
- a recombining device for recombining the plurality of colored beams of light into a single beam of light; and
- a beam directing device for directing the recombined beam of light onto a photosensitive material.

In another aspect of the present invention there is provided a method of exposing a photosensitive material with a single modulated white light source to simultaneously write a red, green, and blue image onto a photosensitive material comprising the steps of:

- providing a first beam of light comprising of at least two colors, comprising the steps of providing a beam of light having at least two colors;
- splitting the beam of light into a plurality of predetermined colored beams of light;
- modulating at least two of the individual beams of colored light simultaneously in accordance with image data for each of the colors;
- recombining the individual beams of colored light to form a single beam of light; and
- directing the combined beam of light onto a photosensitive material.

DESCRIPTION OF THE DRAWINGS

FIG. 1 illustrates a diagrammatic view of a light modulation system made in accordance with the present invention;

FIG. 2 is a side view of the device of FIG. 1; and

DETAILED DESCRIPTION OF THE PRESENT INVENTION

Figure 3:
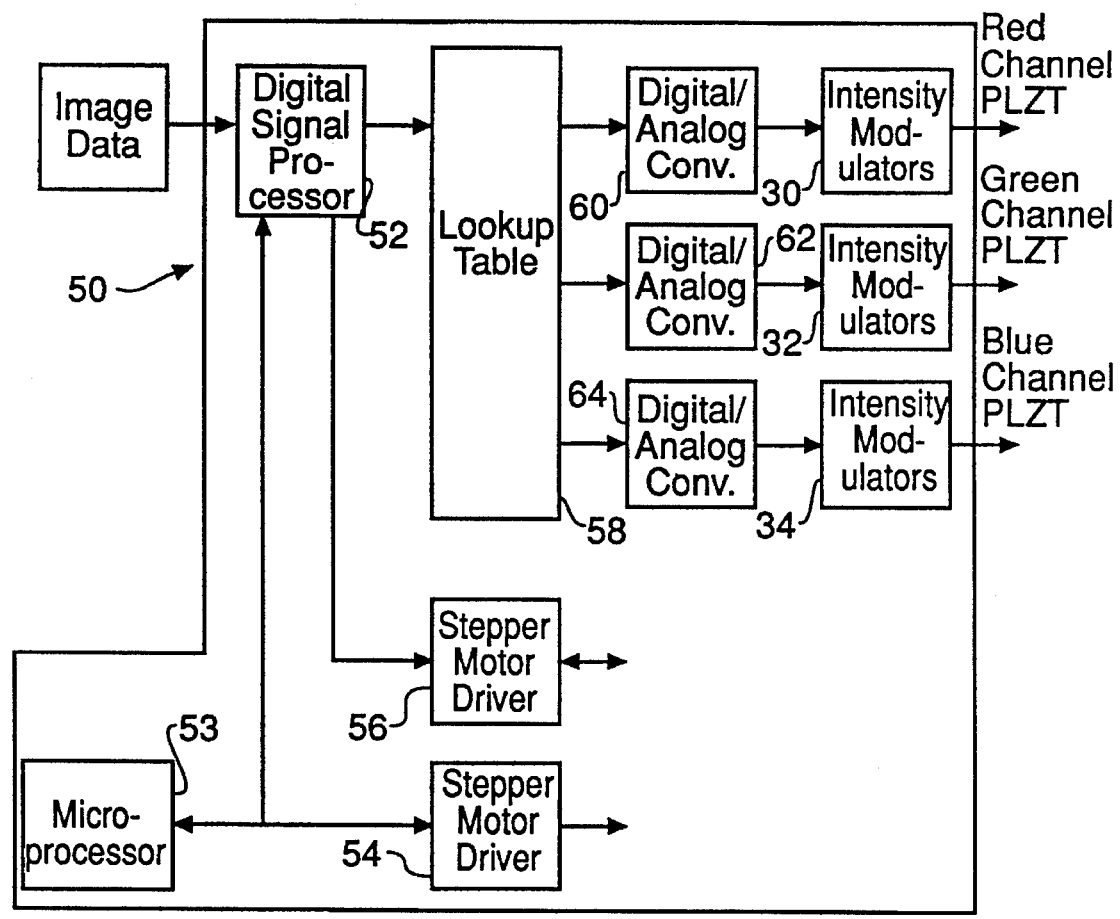
FIG. 3 is a block diagram of the information flow of the device of FIGS. 1 and 2.

Referring to FIGS. 1 and 2, there is illustrated in diagrammatic form, a light modulating system 10 made in accordance with the present invention. In particular, light modulating system 10 includes a light source 12 which produces light having a plurality of color components. In the embodiment illustrated, the light source 12 comprises a white light source 14 having a reflector 16 which concentrates the light produced from white light source 14. A suitable light source that can be used is a xenon arc lamp which may be purchased from Oriel Company or Optical Radiation Corporation. The output of the white light source 14 is collimated with an achromatic collimating lens 18 so as to produce a beam 20 of white light. The collimated white light beam 20 is then incident onto a diffraction grating 22 which disperses light according to wavelength. A suitable grating that may be used is a holographic grating fabricated using a dichromated gelatin plate, such as the KSP 155-01 grating sold by the Eastman Kodak Company having a spacing of 1–2 µm. In particular, the diffraction grating 22 divides the light into red, blue, and green light beams 24,26,28, respectively. Three separate intensity modulators 30,32,34 are inserted in the path of beams 24,26,28, respectively, such that the modulator 30 controls the red light beam, modulator 32 controls the blue light beam, and modulator 34 controls the green light beam. The modulators 30,32,34 can be electro-optic, acoustic-optic, LCD (liquid crystal display), or PLZT modulators. In the particular embodiment illustrated, the modulators 30,32,34 each comprise a PLZT modulator. However, any other type modulators capable of modulating the light beam in accordance with image data may be utilized.

The modulators 30,32,34 controls the intensity of the respective light beam in accordance with the digital image data provided, for example, image data provided by a digital image source such as the Eastman Kodak Photo CD scanner. The CD scanner produces a digital output image signal which is representative of each of the primary colors (e.g., red, blue, and green). After each of the light beams 24,26,28 have been modulated in accordance with the appropriate image data for that color, the beams 24,26,28 are recombined using a second diffraction grating 36. The second diffraction grating 36 has a pitch which is twice that of the first grating which provides a compensating dispersion for recombining the beams of light. The light beams 24,26,28 are then incident on a third diffraction grating 38, which has a grating pitch equal to that of the first diffraction grating 22 to form recombined beam 20'. Grating 38 diffracts the modulated light so that it is parallel to the original optical axis and the three color beams are coincidence. The recombined light beam 20' is focused to a line by an achromatized cylindrical lens 40. The beam 20' then is incident on a rotating polygon mirror 42 which causes the light to be deflected in proportion to the rotating angle of the polygon mirror. After deflection, light beam 20' is incident onto an anamorphic, achromatic F-θ lens 44 which focuses the recombined beam to a small spot which is scanned across a photosensitive material 46 as polygon mirror 42 rotates. Thus, the present invention allows the simultaneous writing of red, green, and blue images and eliminates the need for precise mechanical registration of the three color images written at different times as in printing presses and in other three-color electrophotographic systems.

Referring to FIG. 2, there is illustrated a block diagram illustrating how the system of FIGS. 1 and 2 operates. In particular, image data from, for example, a digital scanner, would be provided to the printer 50. The printer includes a digital signal processor 52, a microprocessor 53, and a stepper motor driver 54 which produces a signal used to control a motor (not shown) which drives the photosensitive material 46 through the device. A second stepper motor driver 56 is provided which produces signals controlling a second motor (not shown) which rotates the polygon mirror 42. The digital image data that is sent to the printer 50 is transferred from the digital signal processor to a three-channel lookup table 58 wherein the appropriate intensity values for the incoming information for the red, green, and blue colors are determined. The information regarding each of the colors is then sent to digital/analog converters 60,62, 64, for each color, which is then forwarded to its respective modulator 30,32,34, and is then used to modulate each of the respective colored beams of light as previously described. The recombined beam 20' of light is focused on to the photosensitive material 46 for forming an image thereon.

The system of FIGS. 1 and 2 is most useful in a photographic printer for printing a photosensitive material, such as film and/or paper. FIG. 3 illustrates in diagrammatic form a photographic printer incorporating the system of FIGS. 1 and 2. In particular, there is illustrated a printer 50 having a modulating system illustrated in FIGS. 1 and 2, like numerals representing like parts. In particular, the modulated white light is focused onto a photosensitive material which is then processed so as to develop the image as is customarily done in the prior art.

Various modifications and changes may be made without departing from the scope of the present invention. While in the preferred embodiment illustrated, white light source is provided which is divided up into three primary colors, other combinations may be provided wherein a light source other than white may be divided up into other individual component colors wherein by each of the colors are modulated with respect to the information for that particular color which are then recombined to the original color for exposing onto the photosensitive material. Additionally, while the preferred embodiment illustrated is used for a photosensitive material, for example, as in photographic emulsions used in film and paper, the present system could also be used in other systems such as electrophotographic-type printers.

Thus, the present invention provides a system for modulating a light source to generate a multi-colored writing beam in parallel which provides a low cost, high speed printing of color images and allows the use of existing photosensitive media.

It is to be understood that various other changes and modifications may be made without departing from the scope of the present invention, the present invention being defined by the claims that follow.

Parts List:

10 . . . modulating system
12 . . . light source
14 . . . white light source
16 . . . reflector
18 . . . collimating lens
20,20' . . . beam of white light
22,36,38 . . . diffraction grating
24,26,28 . . . light beams
30,32,34 . . . intensity modulators
40 . . . cylindrical lens
42 . . . polygon mirror
44 . . . F-θ lens
46,55 . . . photosensitive material
50 . . . printer
52 . . . digital signal processor
53 . . . microprocessor
54,56 . . . stepper motor driver
58 . . . lookup table
60,62,64 . . . digital/analog converters

We claim:

1. A photographic printer comprising:

a white light source for producing white light;

a collimating lens for collimating light from said light source so as to form a beam of white light;

a beam modulating assembly for modulating the beam of white light, said modulating assembly comprising a first diffraction grating for splitting the beam of white light into a plurality of individual predetermined beams of light each having an intensity and a different color, a second diffraction grating and a third diffraction grating for recombining the plurality of individual predetermined beams of light, each of said diffraction grating having a pitch, the pitch of the first and third diffraction grating being the same, and the pitch of the second grating being twice that of the pitch of the first diffraction grating, and a modulator for modulating the intensity of each of the colored beams of light individually in accordance with imaging data for each of said colored beams of light; and a beam directing assembly for directing the recombined beam of white light onto a photosensitive material, comprising an achromatized cylindrical lens which focuses the combined beam wherein the recombined light beam is passed through an anomorphic, achromatic, F-θ lens for focusing of the recombined beam of light to a small spot for exposure onto the photosensitive material.

2. A printer according to claim 1 wherein said beam splitter for splitting the light beams into a plurality of colored beams of light comprises a diffraction grating.

3. A printer according to claim 1 wherein said beam splitter splits said beam of white light into three primary colors comprising blue, red, and green.

4. A photographic printer according to claim 1 wherein said modulator for modulating the intensity of each of the beams of colored light comprises a PLTZ modulator.

5. A photographic printer according to claim 1 wherein the modulator comprises an LCD modulator.

6. A photographic printer according to claim 1 wherein the modulator comprises a PLTZ modulator.

7. A photographic printer according to claim 1 wherein said beam directing device includes a rotating polygon mirror which scans the light beam across the photosensitive material.

8. A method of simultaneously modulating a plurality of different primary colors in a beam of white light, comprising the steps of:

providing a first beam of white light;

splitting the beam of white light into a plurality of predetermined colored beams of light with a beam modulating assembly, said modulating assembly comprising a first diffraction grating for splitting the beam of white light into a plurality of individual predetermined beams of light each having an intensity and a different color, a modulator for modulating the intensity of each of the colored beams of light individually in accordance with imaging data for each of said colored beams of light, a second diffraction grating and a third diffraction grating for recombining the plurality of individual predetermined beams of light, each of said diffraction grating having a pitch, the pitch of the first and third diffraction gratings being the same, and the pitch of the second grating being twice that of the pitch of the first diffraction grating, and;

modulating each of the individual beams of colored light simultaneously after the said beam of light has passed through said first diffraction grating in accordance with image data for each of the colored beams of light, and;

recombining said individual beams of colored light which have been modulated to again form a single beam of white light.

9. A method according to claim 8 further comprising the step of exposing said recombined beam of light on to a photosensitive material.

10. A method according to claim 8 wherein said beam of white light is split into three colored beams of light.

11. A method according to claim 8 wherein three beams of colored light comprise blue, red and green.

12. A photographic printer comprising:

a light source for producing light composed of at least two colors;

a collimating lens for collimating light from said light source so as to form a beam of light;

a beam modulating assembly for modulating the beam of light, said modulating assembly comprising a first diffraction grating for splitting the beam of light into a plurality of individual predetermined beams of light each having an intensity and a different color, a second diffraction grating and a third diffraction grating for recombining the plurality of individual predetermined beams of light, each of said diffraction grating having a pitch, the pitch of the first and third diffraction grating being the same, and the pitch of the second grating being twice that of the pitch of the first diffraction grating, and a modulator for modulating the intensity of each of the colored beams of light individually in accordance with imaging data for each of said colored beams of light; and a beam directing device for directing the recombined beam of light onto a photosensitive material, comprising an achromatized cylindrical lens which focuses the combined beam wherein the recombined light beam is passed through an anomorphic, achromatic, F-θ lens for focusing of the recombined beam of light to a small spot for exposure onto the photosensitive material.

13. A printer according to claim 12 wherein said beam splitter for splitting the light beams into a plurality of colored beams of light comprises a diffraction grating.

14. A photographic printer according to claim 12 wherein said recombining device for recombining the colored beams of light into a single beam of white light comprises a diffraction grating.

15. A printer according to claim 12 wherein said beam splitter splits said beam of white light into three primary colors comprising blue, red, and green.

16. A photographic printer according to claim 12 wherein said modulator for modulating the intensity of each of the beams of colored light comprises a PLTZ modulator.

17. A photographic printer according to claim 12 wherein the modulator comprises an LCD modulator.

18. A photographic printer according to claim 12 wherein the modulator comprises a PLTZ modulator.

19. A photographic printer according to claim 12 wherein said beam directing device includes a rotating polygon mirror which scans the light beam across the photosensitive material.

20. A method of simultaneously modulating a plurality of different primary colors in a beam of light, comprising the steps of:

providing a first beam of light;

splitting the beam of light into a plurality of predetermined colored beams of light with a beam modulating device, said modulating device comprising a first diffraction grating for splitting the beam of light into a plurality of individual predetermined beams of light each having an intensity and a different color, a modulator for modulating the intensity of each of the colored beams of light individually in accordance with imaging data for each of said colored beams of light, a second diffraction grating and a third diffraction grating for recombining the plurality of individual predetermined beams of light, each of said diffraction grating having a pitch, the pitch of the first and third diffraction grating being the same, and the pitch of the second grating being twice that of the pitch of the first diffraction grating, and;

modulating each of the individual beams of colored light simultaneously after the said beam of light has passed through said first diffraction grating in accordance with image data for each of the colored beams of light.

21. A method of simultaneously modulating a plurality of different primary, colors in a beam of light according to claim 20, further comprising the step of directing the recombined beam of light onto a photosensitive material utilizing an achromatized cylindrical lens which focuses the combined beam of light and an anamorphic, achromatic, F-θ lens for focusing the recombined beam of light onto the photosensitive material.

* * * * *